(12) United States Patent
Miyazaki

(10) Patent No.: US 7,921,891 B2
(45) Date of Patent: Apr. 12, 2011

(54) PNEUMATIC TIRE FOR TRAVELING ON OFF ROAD

(75) Inventor: Tetsuji Miyazaki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 799 days.

(21) Appl. No.: 11/854,624

(22) Filed: Sep. 13, 2007

(65) Prior Publication Data

US 2008/0073012 A1 Mar. 27, 2008

(30) Foreign Application Priority Data

Sep. 25, 2006 (JP) ................. 2006-259137

(51) Int. Cl.
*B60C 11/11* (2006.01)
*B60C 11/13* (2006.01)

(52) U.S. Cl. ............. 152/209.15; 152/209.19; 152/902; 152/DIG. 1

(58) Field of Classification Search ............ 152/209.15, 152/209.19, 902, DIG. 1
See application file for complete search history.

(56) References Cited

U.S. PATENT DOCUMENTS

| | | | | |
|---|---|---|---|---|
| 3,707,177 A | * | 12/1972 | Boileau | 152/902 |
| 5,456,301 A | * | 10/1995 | Wise | 152/209.15 |
| 5,957,180 A | * | 9/1999 | Kuramochi et al. | 152/209.21 |
| 6,401,774 B1 | * | 6/2002 | Rooney | 152/209.19 |
| 6,866,076 B2 | * | 3/2005 | Ohsawa | 152/902 |
| 2008/0041509 A1 | | 2/2008 | Shimizu | |

FOREIGN PATENT DOCUMENTS

| | | |
|---|---|---|
| CN | 1712252 | 12/2005 |
| JP | 06-328911 | * 11/1994 |
| JP | 10-35224 | 2/1998 |
| JP | 2000-43513 | 2/2000 |
| JP | 2005-067246 | * 3/2005 |
| JP | 2006-213175 | 8/2006 |

OTHER PUBLICATIONS

Machine translation for Japan 06-328911 (no date).*
Machine translation for Japan 2005-067246 (no date).*

* cited by examiner

*Primary Examiner* — Steven D Maki
(74) *Attorney, Agent, or Firm* — Fish & Richardson P.C.

(57) ABSTRACT

In a pneumatic tire for traveling on an off road, including a tread pattern in which a plurality of blocks are formed by at least three vertical grooves extending along a tire circumferential direction and a lateral groove intersecting the vertical grooves, each of the lateral groove arranged among the three vertical grooves and the vertical groove arranged in a middest portion has a groove wall surface forming a step portion, and a projecting stripe continuing approximately at an identical height is provided at a whole of each groove bottom thereof.

4 Claims, 4 Drawing Sheets

(a)

(b)

PNEUMATIC TIRE FOR TRAVELING ON OFF ROAD

BACKGROUND OF THE INVENTION

1. Field of the Invention

The present invention relates to a pneumatic tire for traveling on an off road which is used on an off road such as a desert, a gravel road, a dirt road, and a rocky place, like a tire for a desert race, a mud and snow tire.

2. Description of the Related Art

Since the tire for traveling on the off road is mainly used on the off road such as the desert, the gravel road, the dirt road, the rocky place, it is required to prevent a puncture caused by a stone-biting. Accordingly, there has been employed a shape in which a cross sectional shape of a groove is formed in a V-shaped form, so that a pebble and the like are hard to be pinched and tend to be detached. However, in the V-shaped groove, a puncture resistance is not sufficient, and a traction performance at an end stage of abrasion also becomes insufficient.

On the other hand, for a tire for a truck which frequently moves on the gravel road or the like, as a technique for preventing the puncture caused by the stone-biting, there has been known a method of setting a projection at a groove bottom. For example, in Japanese Unexamined Patent Publication No. 2000-43513, there is disclosed a structure in which a projection continuing in a tire circumferential direction at a groove bottom of a shoulder portion adjacent to a block. Further, in Japanese Unexamined Patent Publication No. H10-35224, there is disclosed a structure in which a projection having a larger height and a projection having a smaller height are alternately provided at a groove bottom of a groove formed in the periphery of the block.

However, in both of the tires mentioned above, since opposing groove wall surfaces of the groove provided with the projection rise up linearly, the pebble and the like tend to be pinched between the opposing groove wall surfaces and are hard to be detached, resulting in that a depression effect of the puncture caused by the stone-biting is small. Further, in the structure in which the large and small projections are alternately provided at the groove bottom such as disclosed in Japanese Unexamined Patent Publication No. H10-35224, the puncture resistance and the traction performance at the end stage of abrasion are not to be sufficient.

SUMMARY OF THE INVENTION

Accordingly, an object of the present invention is to provide a pneumatic tire for traveling on an off road which can improve a puncture resistance by being formed in such a shape that a pebble and the like are hard to be pinched, and can secure a traction performance at the end stage of abrasion.

The object can be achieved by the present invention having the following structure. That is, the present invention provides a pneumatic tire for traveling on an off road, comprising a tread pattern in which a plurality of blocks are formed by at least three vertical grooves extending along a tire circumferential direction and a lateral groove intersecting the vertical grooves, wherein each of the lateral groove arranged among the three vertical grooves and the vertical groove arranged in a middest portion has a groove wall surface forming a step portion, and a projecting stripe continuing approximately at an identical height is provided at a whole of each groove bottom thereof.

In accordance with the pneumatic tire for traveling on the off road of the present invention, since the groove provided with the projecting stripe continuing approximately at an identical height at the groove bottom is arranged in the region (the region from the tire center portion to the shoulder portion) among the three vertical grooves which tend to affect the traction performance when traveling on the off road, it is possible to improve the traction performance at the end stage of abrasion. Further, since the groove wall surface having the step portion formed thereon is provided in addition to the provision of the projecting stripe at the groove bottom, it is possible to achieve such the shape that the pebble and the like are hard to be pinched. Furthermore, since the groove wall surface is provided in a region to which a load tends to be applied at a time of traction, it is possible to effectively improve the puncture resistance. As a result, it is possible to provide the tire for traveling on the off road which can improve the puncture resistance by forming such the shape that the pebble and the like are hard to be pinched, and can secure the traction performance at the end stage of abrasion.

In the above structure, it is preferable that the projecting stripe continuing approximately at the identical height is provided in a periphery of the block by forming a projecting stripe at the groove bottom of each of the vertical grooves at both sides. It is possible to improve the puncture resistance near the shoulder portion by forming the projecting stripe in the vertical groove near the shoulder portion. Further, since the rigidity of the projecting stripe becomes higher by forming the continuing projecting stripe in the periphery of the block, in comparison with the case where the projecting stripe interrupting in the boundary portion is provided, resulting in the further improved traction performance.

In the above structure, it is preferable that the lateral groove intersecting the vertical grooves at the both sides are further extended to an outer side of the tire, the extended lateral groove is provided with a groove wall surface formed with the step portion, and the projecting stripe continuing approximately at the identical height is provided at each of the groove bottoms. Accordingly, it is possible to improve the puncture resistance in a wider region of a tread, and it is possible to secure the traction performance at the end stage of abrasion.

DETAILED DESCRIPTION OF THE PREFERRED EMBODIMENT

Figure 1:
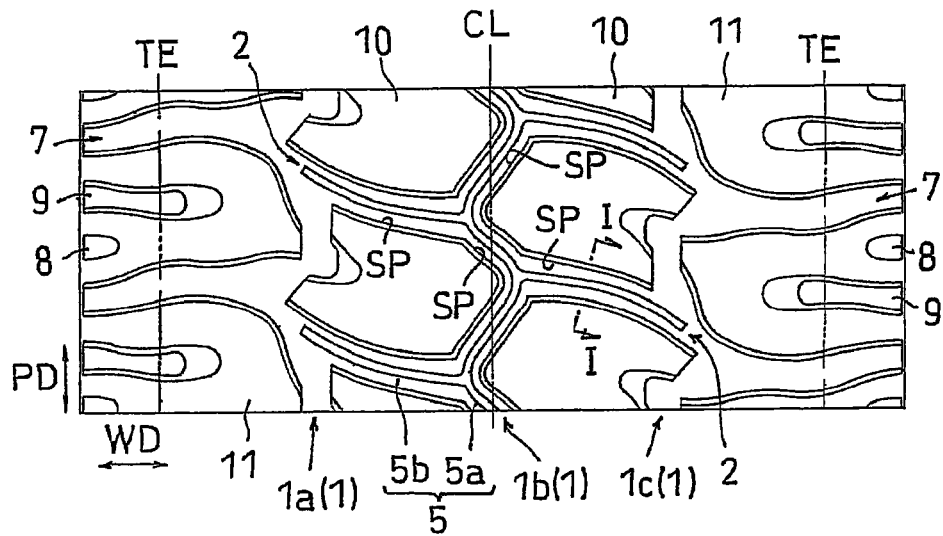
FIG. 1 is an expansion plan view showing an example of a tread pattern in a pneumatic tire in accordance with the present invention.
Figure 2:
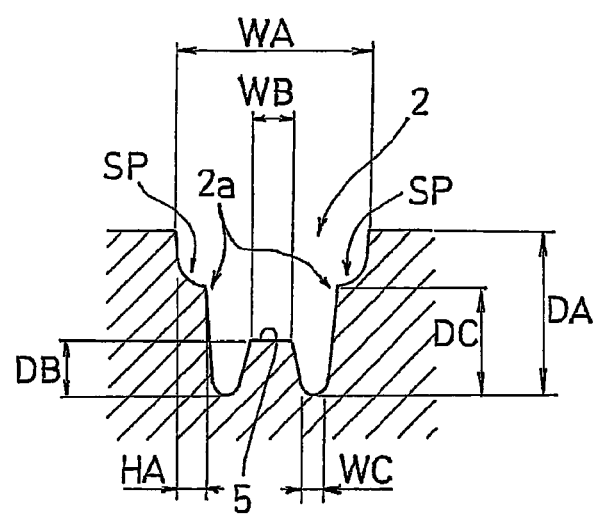
FIG. 2 is a cross sectional view of a main portion showing a cross section along a line I-I of an example of the pneumatic tire in accordance with the present invention.

An embodiment of the present invention will be explained with reference to the drawings. FIG. 1 is an expansion plan view showing an example of a tread pattern in a pneumatic tire in accordance with the present invention. FIG. 2 is a cross sectional view of a main portion showing a cross section along a line I-I of an example of the pneumatic tire in accordance with the present invention.

A pneumatic tire for traveling on an off road in accordance with the present invention is provided with a tread pattern in which a plurality of blocks 10 are formed by at least three vertical grooves 1 extending along a tire circumferential direction PD and a lateral groove 2 intersecting the vertical grooves 1, as shown in FIG. 1. In the present embodiment, there is shown an example in which three vertical grooves 1 are formed in a zigzag shape.

The three vertical grooves 1 may be structured such that any one or all of them is formed approximately in a linear shape, however, in the light of a further improvement of the off road traveling performance, it is preferable to include the zigzag-shaped vertical groove 1, and it is more preferable that all the vertical grooves 1 are formed in the zigzag shape.

The zigzag-shaped vertical groove 1 can be formed by sloping a wall surface of the block 10 with respect to the tire circumferential direction PD such as a vertical groove 1b in the illustrated example, or can be formed by providing a zigzag-shaped wall surface in the block 10 such as vertical grooves 1a and 1c at both sides.

The three vertical grooves 1 may be provided at any position in a tire width direction WD, however, it is preferable that the center vertical groove 1b is provided near a tire equator line CL. The vertical grooves 1a and 1c at the both sides are preferably structured such that a center position thereof is arranged within a region between 35 and 80% of a distance from the tire equator line CL to a ground end TE, particularly within a region between 50 and 65% thereof. In this case, the ground end TE indicates a ground width at a time of applying a tire air pressure and a load based on JASO-C607.

It is sufficient that lateral grooves 2 and 7 intersect the vertical groove 1, and the lateral grooves 2 and 7 may be formed in the tire width direction WD or at a sloping angle with respect to the tire width direction WD. In the present embodiment, there is shown an example in which the lateral groove 2 slopes with respect to the tire width direction WD, the lateral groove 7 closer to the ground end than the vertical grooves 1a and 1c at the both sides is formed at an sloping angle with respect to the tire width direction WD, and both opening portions in the lateral grooves 7 at the both sides are arranged out of alignment.

In the present invention, as shown in FIG. 2, each of the lateral groove 2 arranged among the three vertical grooves 1 and the vertical groove 1b arranged in the middest portion has a groove wall surface 2a formed with a step portion SP. In the present embodiment, there is shown an example in which the step portion SP is formed by providing a portion having a circular arc shaped cross section on the groove wall surface 2a. The step portion SP is not necessarily formed with a fixed height at a fixed position in the cross section, however, it is preferable in the light of an improvement of the puncture resistance that the step portion SP is continuously formed with a fixed height at a fixed position.

In the light of the pebble and the like being hard to be pinched and tending to be detached, the position of the step portion SP being formed is preferably between 45 and 85% of a groove depth DA based on a height DC from the groove bottom to a boundary line with the step portion SP, and is more preferably between 60 and 85% thereof. A plurality of step portions SP can be provided, and in such a case, it is sufficient that any step portion SP is in the range of the height DC mentioned above.

In this case, the groove depth DA of the lateral groove 2 can be set, for example, between 8 and 17 mm, and the groove depth DA of the vertical groove 1 can be set, for example, between 8 and 17 mm.

Further, a height HA of the step portion SP itself is preferably equal to or more than 1 mm, and more preferably equal to or more than 2 mm, in the light of the pebble and the like being hard to be pinched and tending to be detached.

Further, each of the lateral groove 2 arranged among the three vertical grooves 1 and the vertical groove 1b arranged in the middest portion is provided with a projecting stripe 5 continuing over a whole of the groove bottom thereof approximately at an identical height. In the present embodiment, there is shown an example in which a projecting stripe 5b provided in the lateral groove 2 is branched alternately to right and left from a zigzag-shaped projecting stripe 5a provided in the vertical groove 1b.

In the light of an effective prevention of stone-biting, a height DB of the projecting stripe 5 is preferably equal to or more than 2.0 mm and equal to or less than 65% of the groove depth DA, and more preferably equal to or more than 3.0 mm and equal to or less than 50% of the groove depth DA.

In the light of a sufficiently securing an earth removing performance, a width of the projecting stripe 5 is preferably set such that a width WB is equal to or more than 2.0 mm based on an upper surface thereof, and is equal to or less than 50% of a groove width WA based on the upper surface. In this case, in the light of maintenance of the earth removing performance and the traction performance, the groove width WA of the lateral groove 2 is preferably equal to or more than 8 mm. In the light of the earth removing performance, the groove width WA of the vertical groove 1 is preferably equal to or more than 8 mm.

In the light of the effective prevention of the stone-biting, an interval WC between the projecting stripe 5 and the groove wall surface 2a is preferably equal to or less than 3 mm, and more preferably equal to or less than 2 mm. In this case, the interval WC indicates a distance between an intersecting point at a time of extending the wall surface of the projecting stripe 5 and an intersecting point at a time of extending the groove wall surface 2a with respect to a tangential line drawn to the groove bottoms at the both sides.

In the light of the matters mentioned above, it is preferable that the projecting stripe 5 is provided approximately in the middle of the lateral groove 2, and approximately in the middle of the vertical groove 1b. In this case, it is not necessary that the width WB of the projecting stripe 5 is constant, and in the case where the width WB is changed, it is preferable that an average value thereof satisfies the range mentioned above.

In the present embodiment, the lateral groove 7 branched from the vertical grooves 1a and 1c is provided in the ground end side of the vertical grooves 1a and 1c, and another lateral grooves 8 and 9 are formed in a block 11 separated by the lateral groove 7. The lateral groove 7 has an identical depth as those of the intersecting vertical grooves 1a and 1c, however, may be set between 45 to 100% of the depth of the vertical grooves 1a and 1c.

The pneumatic tire in accordance with the present invention is similar to a normal pneumatic tire except provision of the tread pattern as mentioned above, and it is possible to employ the conventionally known material, shape, structure, manufacturing method and the like to the present invention.

Since the pneumatic tire in accordance with the present invention can improve the puncture resistance by being formed in such the shape that the pebble and the like are hard to be pinched, and is provided with the tread pattern which can secure the traction performance at the end stage of abrasion, the pneumatic tire in accordance with the present invention is useful as the tire for traveling on the off road such as the tire for the desert race, the mud and snow tire, and the tire for the desert.

It is general that the zigzag-shaped vertical groove is formed without setting any sipe and the comparatively shallow vertical groove and lateral groove are formed as the tread pattern of the tire for traveling on the off road mentioned above, however, sipe can be formed therein.

Other Embodiment

Other embodiments of the present invention will be explained.

(1) In the embodiment mentioned above, there is shown the example provided with the tread pattern in which the block as shown in FIG. 1 is formed, however, the block is not limited to such a shape, but may be formed in any shape such as an approximate square shape, a rectangular shape, a parallelogram shape, a rhomboid shape, a polygonal shape and the like.

Figure 3:
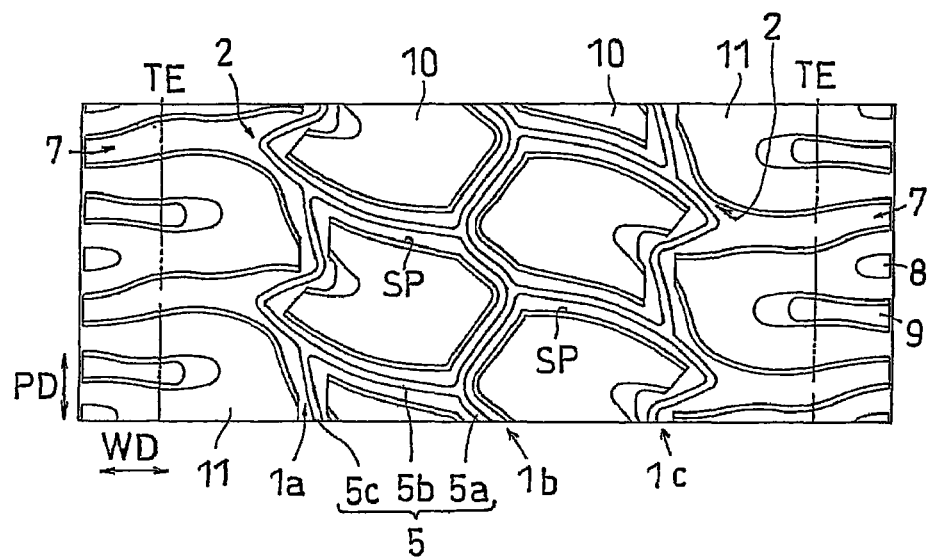
FIG. 3 is an expansion plan view showing another example of the tread pattern in the pneumatic tire in accordance with the present invention.

(2) In the embodiment mentioned above, there is shown the example provided with the projecting stripe continuing over the whole of the groove bottoms of the lateral groove arranged among the three vertical grooves and the vertical groove arranged in the middest portion, however, the present invention is preferably structured, as shown in FIG. 3, such that the projecting stripe 5 continuing approximately at an identical height is provided in the periphery of the block 10 by also setting the projecting stripe 5c at the groove bottoms of the vertical grooves 1a and 1c at the both sides. At this time, the step portion SP may be also formed on the groove wall surface of the vertical grooves 1a and 1c at the both sides.

It is preferable that a relation between a width and a height of the projecting stripe 5c, and a depth and a width of the vertical grooves 1a and 1c is equal to a relation between the width and the height of the projecting stripe 5b and the depth and the width of the lateral groove 2, as mentioned above.

Figure 4:
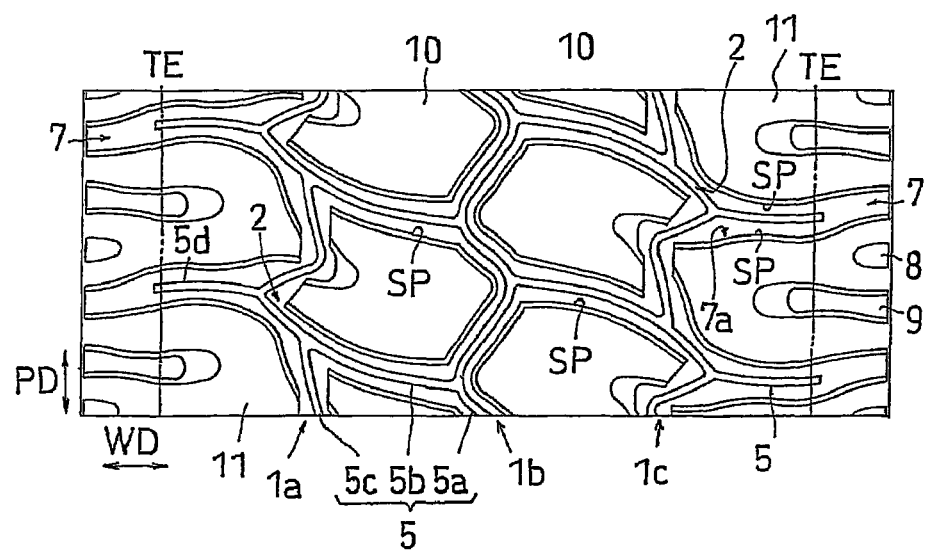
FIG. 4 is an expansion plan view showing further another example of the tread pattern in the pneumatic tire in accordance with the present invention.

Further, as shown in FIG. 4, it is preferable that the lateral groove 7 intersecting the vertical grooves 1a and 1c at the both sides is further extended to an outer side of the tire, the extended lateral groove 7 is also provided with a groove wall surface 7a formed with the step portion SP thereon, and each of the groove bottoms thereof is provided with a projecting stripe 5d continuing approximately at an identical height.

It is preferable that a relation between a width and a height of the projecting stripe 5d and the depth and the width of the lateral groove 7 is equal to the relation between the width and the height of the projecting stripe 5b and the depth and the width of the lateral groove 2, as mentioned above.

Figure 5:
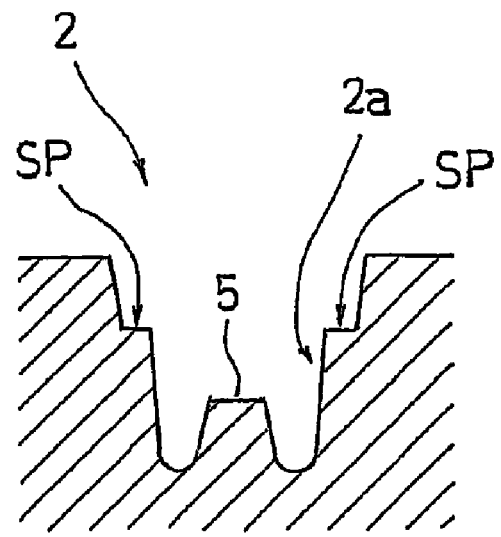
FIG. 5 is a cross sectional view of a main portion showing another example of the pneumatic tire in accordance with the present invention.
Figure 5:
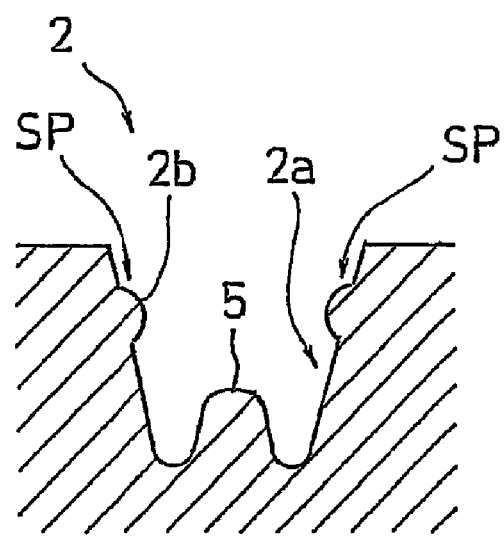

(3) In the embodiment mentioned above, there is shown the example in which the step portion is formed by providing the portion having the circular arc shaped cross section, however, the present invention can employ various shapes as far as the step portion is formed, and for example, there can be exemplified structures shown in FIGS. 5(a) to 5(b). In this case, a plurality of step portions SP may be provided on each of the groove wall surfaces.

In the example shown in FIG. 5(a), the step portion SP is formed by providing a portion having a linear cross section. In this case, in the light of durability of the step portion SP and the effect of preventing the stone-biting, it is preferable that an upper surface of the step portion SP slopes at 0 to 40 degrees with respect to a flat surface in parallel with a tread surface.

In the example shown in FIG. 5(b), the step portion SP is formed by providing a projection portion 2b having a circular arc shaped cross section on the groove wall surface 2a. In this case, in the light of the durability of the step portion SP and the effect of preventing the stone-biting, a height of the projection is preferably between 1 and 4 mm.

Further, in the present invention, a top portion of the projecting stripe 5 can be formed in a circular arc shaped cross section or the like as in this example. In this case, it is preferable that a width WB comes to the range mentioned above, the width WB corresponding to a distance between intersecting points at a time of extending the side walls with respect to a tangential line in parallel with the tread surface drawn to a peak of the projecting stripe 5.

(4) In the embodiment mentioned above, there is shown the example in which the three vertical grooves are formed in the tread, however, in the present invention, four vertical grooves, or five or more vertical grooves may be formed in the tread. In this case, it is sufficient that the groove wall surface formed with the step portion thereon is provided in each of the vertical groove arranged in the middest portion and the lateral groove arranged among at least three vertical grooves including the vertical groove mentioned above, and the projecting stripe continuing approximately at an identical height is provided in a whole of the respective groove bottom. In this case, in the light of the improvement of the puncture resistance in a wider region of the tread, and securing the traction performance at the end stage of abrasion, it is preferable that the step portion and the projecting stripe are provided in all the vertical grooves, and all the lateral grooves arranged among the vertical grooves.

EXAMPLES

An example tire which concretely shows the structure and effect of the present invention will be explained. An evaluation of each of performances is executed as follows.

(1) Puncture Resistance

A tire assembled in a rim and filled with an air pressure of 240 kPa is installed to an actual car (a pickup truck, 4WD, 5600 cc), is traveled on an off road course (a road surface mainly constituted by stones, sands and soils) under a load condition of two passengers on board, and is searched the number of cut scratches at a groove bottom after traveling 5000 km to evaluate a puncture resistance. In this case, the evaluation is indicated by an index number when result of a conventional product (a comparative example 1) is set to 100, and the larger numerical value indicates the better result.

(2) Traction Performance with 70% Abrasion

The tire is traveled on the off road course under the same condition as that in the above (1) after being worn at 70% with a buff work, and is measured an orbiting lap to evaluate a traction performance. In this case, the evaluation is indicated by an index number when result of a conventional product (a comparative example 1) is set to 100, and the larger numerical value indicates the better result.

Example 1

In the tread pattern shown in FIGS. 1 and 2, a depth DA of each of the vertical groove 1 and the lateral groove 2 is set to 12.5 mm, a groove width WA is set to 14 mm, a height HA of the step portion is set to 2 mm, a width WB of the projecting stripe 5 is set to 3 mm, a height DB is set to 4 mm, and an interval WC is set to 1.5 mm to manufacture a radial tire having a size 35×12.50R15LT. A result obtained by executing each of the performance evaluations mentioned above by using the tire is shown in Table 1.

Example 2

A radial tire is manufactured in the same manner as in the example 1 as shown in FIG. 3 except for further provision of the projecting stripe 5c having the same shape and size. A result obtained by executing each of the performance evaluations mentioned above by using the tire is shown in Table 1.

Comparative Example 1

Conventional Product

Example 3

A radial tire is manufactured in the same manner as in the example 1 as shown in FIG. 4 except for further provision of the projecting stripe 5c and 5d having the same shape and size. A result obtained by executing each of the performance evaluations mentioned above by using the tire is shown in Table 1.

Comparative Example 1

Conventional Product

Figure 6:
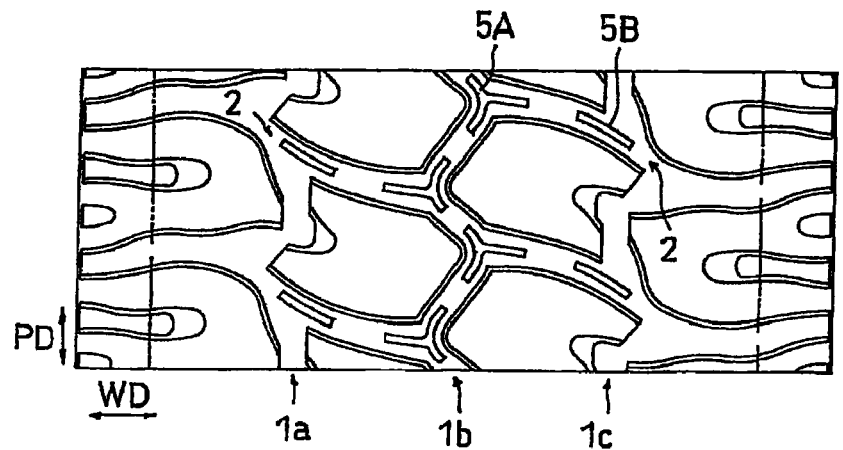
FIG. 6 is an expansion plan view showing an example of a tread pattern in a conventional product (a comparative example 1)

A radial tire is manufactured in the same manner as in the example 1 as shown in FIG. 6 except for forming discontinuous projecting stripes 5A and 5B (having the same cross sectional shapes) in the vertical groove and the lateral groove. A result obtained by executing each of the performance evaluations mentioned above by using the tire is shown in Table 1.

Comparative Example 2

Figure 7:
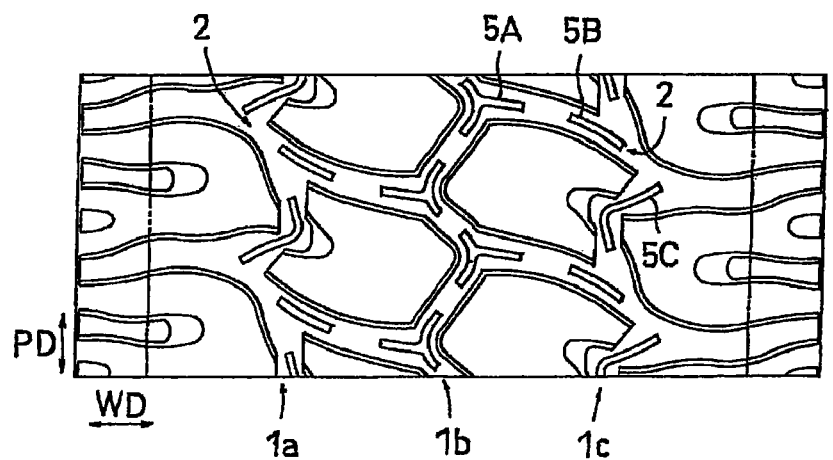
FIG. 7 is an expansion plan view showing another example of the tread pattern in the conventional product (a comparative example 2).

A radial tire is manufactured in the same manner as in the example 1 as shown in FIG. 7 except for forming discontinuous projecting stripes 5A, 5B and 5c (having the same cross sectional shapes) in the vertical groove and the lateral groove. A result obtained by executing each of the performance evaluations mentioned above by using the tire is shown in Table 1.

stripe becomes wider, the effect of improving the traction performance and the effect of improving the puncture resistance are smaller.

What is claimed is:

1. A pneumatic tire for traveling on an off road, comprising a tread pattern in which a plurality of blocks are formed by at least three vertical grooves extending along a tire circumferential direction and a plurality of lateral grooves intersecting the vertical grooves, wherein
    each of the lateral grooves arranged among the three vertical grooves and the vertical groove arranged in a middle-most portion have a groove wall surface forming a step portion, and a projecting stripe continuing approximately at an identical height is provided at a whole of the middle-most vertical groove bottom and each lateral groove bottom thereof, wherein
    the projecting stripe continuing approximately at the identical height is provided in a periphery of the blocks by forming a projecting stripe at the groove bottom of each of the vertical grooves at both sides and wherein
    the groove depth of the lateral grooves is between 8 and 17 mm, the groove depth of the vertical grooves is between 8 and 17 mm, the height of the projecting stripe is equal to or more than 2.0 mm and equal to or less than 65% of the groove depth, the width of the projecting stripe is equal to or more than 2.0 mm based on an upper surface thereof and is equal to or less than 50% of the groove width based on an upper surface, and the projecting stripe is formed having a cross section with a flat top portion or a circular arc shaped top portion.
2. The pneumatic tire for traveling on the off road as claimed in claim 1, wherein the lateral grooves intersecting the vertical grooves at the both sides are further extended to an outer side of the tire, the extended lateral grooves are provided with a groove wall surface formed with the step portion, and the projecting stripe continuing approximately at the identical height is provided at each of the extended lateral groove bottoms.

TABLE 1

|  | Comparative Example 1 | Example 1 | Example 2 | Example 3 | Comparative Example 2 |
|---|---|---|---|---|---|
| Kind of projecting stripe | Discontinuous | Continuous | Continuous | Continuous | Discontinuous |
| Formed position of projecting stripe | Center vertical groove + lateral groove | Center vertical groove + lateral groove | Three vertical grooves + lateral groove | Three vertical grooves + all lateral grooves | Three vertical grooves + lateral groove |
| Puncture resistance | 100 | 135 | 147 | 165 | 108 |
| Traction performance at a time of abrasion | 100 | 120 | 129 | 140 | 105 |

As shown in the results in Table 1, the puncture resistance and the traction performance at a time of 70% abrasion are both excellent in the examples in comparison with the conventional products. Particularly, the wider the region for providing the projecting stripe is, the more excellent the puncture resistance and the traction performance at the time of 70% abrasion are, as in the example 2 and the example 3.

On the contrary, in the comparative examples 1 and 2, even when the region for providing the discontinuous projecting 3. The pneumatic tire for traveling on the off road as claimed in claim 2, wherein the height of the projecting stripe is equal to 65% of the groove depth and the width of the projecting stripe is equal to 50% of the groove width based on an upper surface.
4. The pneumatic tire for traveling on the off road as claimed in claim 1, wherein the height of the projecting stripe is equal to 65% of the groove depth and the width of the projecting stripe is equal to 50% of the groove width based on an upper surface.

* * * * *